Figure 1:
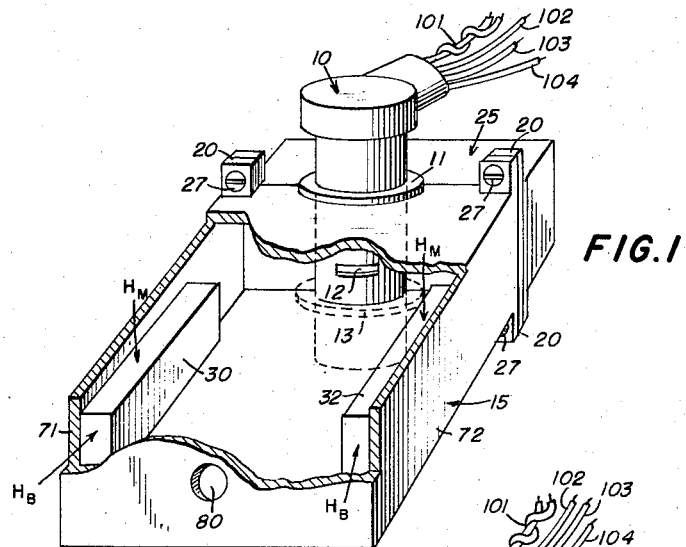

July 28, 1959    G. R. JONES ET AL    2,897,455
MAGNETICALLY TUNED KLYSTRON
Filed Sept. 30, 1957

INVENTORS,
GEORGE R. JONES
JOHN C. CACHERIS
CLYDE A. MORRISON

BY W. E. Thibodeau, T. J. Lynch, F. E. McGee &
J. D. Edgerton

United States Patent Office 2,897,455
Patented July 28, 1959

2,897,455
MAGNETICALLY TUNED KLYSTRON

George R. Jones, Greenbelt, John C. Cacheris, Bethesda, and Clyde A. Morrison, Hyattsville, Md., assignors to the United States of America as represented by the Secretary of the Army Application September 30, 1957, Serial No. 687,306

4 Claims. (Cl. 332—7)

(Granted under Title 35, U.S. Code (1952), sec. 266)

The invention described herein may be manufactured and used by or for the Government for governmental purposes without the payment to us of any royalty thereon.

This invention relates to microwave frequency modulation devices in general, and more particularly to wideband microwave frequency modulation devices which employ a magnetically tuned klystron.

Klystron oscillators are ordinarily modulated in frequency by applying a modulating voltage to the repeller. This method of modulation is limited to small frequency deviations because of the relatively small width of the klystron mode and the considerable amplitude modulation inherent in this method of modulation.

In prior art methods for improving the modulation characteristics of a klystron, attempts have been made to use the tuning characteristics of a ferrite-loaded cavity. A ferrite element was placed in the klystron cavity and its resonant frequency varied by varying the magnetic field applied to the ferrite. Because the mode of oscillation shifts when the field is increased, the mode of oscillation (ordinarily quite small) also shifts making possible very wide frequency deviations. However, the frequency deviations obtained with applied field are not very linear, and there is considerable accompanying amplitude modulation so that this magnetically tuned klystron is unsuitable for many applications. (See IRE Proc., vol. 43, No. 8, August 1955.)

It is the object of this invention, therefore, to provide a magnetically tuned klystron which can produce linear frequency modulation over a wide range with low accompanying amplitude modulation.

In a typical embodiment of the invention, this object is accomplished by a novel construction and orientation of the ferrite elements and the applied magnetic field in an external ferrite-loaded cavity coupled to a klystron. This novel construction and orientation provides considerably better performance than prior art ferrite-loaded cavities operated with klystrons. We have found that even better performance over wider frequency deviations is possible by the addition of the following two means: (1) a considerable improvement in linearity may be obtained by providing means for applying a properly oriented biasing magnetic field to the ferrite elements in addition to the modulating field, and (2) a considerable reduction in accompanying amplitude modulation may be obtained by providing means for applying a voltage to the klystron repeller which is proportional to the coil current producing the modulating magnetic field.

The specific nature of the invention, as well as other objects, uses, and advantages thereof, will clearly appear from the following description and from the accompanying drawing, in which:

Figure 1 is a pictorial representation of a magnetically tuned klystron in accordance with the invention. Portions of the top and front end of the cavity have been removed for illustrative purposes.

Figure 2:
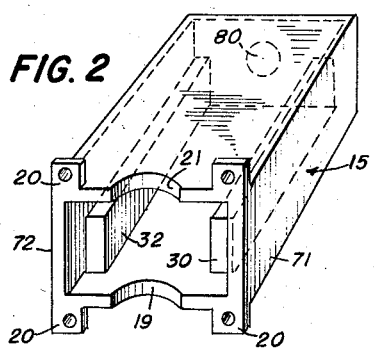
Figures 3, 4:
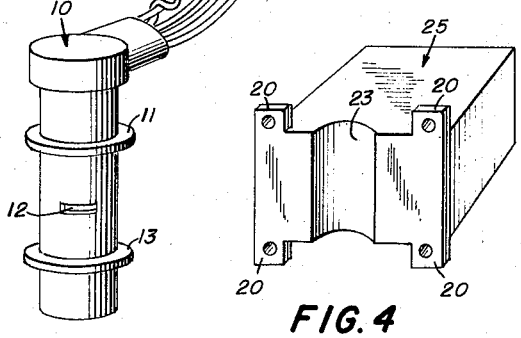

Figures 2, 3 and 4 separately show pictorial representations of the three basic pieces which make up the device of Figure 1.

Figure 5:
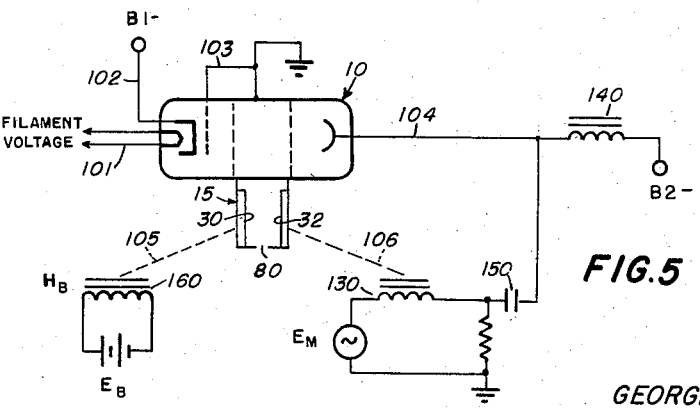

Figure 5 is a schematic representation showing how the device of Figure 1 may be connected in an electric circuit in accordance with the invention.

Referring to the drawing, like numerals represent like parts throughout. Referring now to Figures 1–4, a klystron 10 having an iris 12 is of the type adapted for operation with an external cavity. The filament leads 101 and the cathode, plate and repeller leads 102, 103, 104 respectively, are connected to suitable voltages for proper klystron operation. A $TE_{101}$ transmission cavity 15 serves as this external cavity and has semicircular recesses 19 and 20 (Figures 2) to accept one side of the body of the klystron 10 between the klystron supporting elements 11 and 13. A conductive supporting cap 25 having a recess 23 supports the other side of the klystron body and also serves to provide a conductive termination for the cavity 15. The cap 25 and the cavity 15 may have connecting flange elements 20 for firmly holding the klystron 10 in place.

Either the flange elements 20 of the cap 25 or the cavity 15, or both, may be threaded. Screws 27 may be used to hold the cap 25 and the cavity 15 together. The means for coupling the klystron iris 12 to the cavity 15, and the means for holding the klystron 10 in place, are merely a mattter of design and may be accomplished by any other suitable means.

A pair of rectangular ferrite slabs 30 and 32 are longitudinally disposed within the cavity 15 adjacent to the short sides 71 and 72. A tuning or modulating field $H_M$ is applied to the ferrite slabs 30 and 32 in a direction substantially parallel to the short sides 71 and 72 as shown. Any suitable means, well known in the art, may be used to establish this field $H_M$. The use of an electromagnet incorporating suitable coil means is one example. Or, as a second example, coils may be wound directly around the ferrite slabs 30 and 32. It is also possible to wind the coil on a dielectric of low heat conductivity surrounding the ferrite slabs 30 and 32 to prevent the heat generated in the coils from reaching the ferrite slabs 30 and 32. This assembly can then be placed in the cavity 15 in a position where the wires do not interfere appreciably with the microwave fields in the ferrite. The operating point may be established by an etxernal magnet and modulation achieved by applying a signal to the coil inside the cavity 15. An iris 80 at the end of the cavity 15 opposite the klystron 10 is used to couple energy out of the cavity 15.

The oscillation frequency of the klystron 10 is dependent upon the magnitude of the applied magnetic field $H_M$. If the current flowing through the coil means establishing the magnetic field $H_M$ is varied, a frequency modulated signal may be obtained at the output iris 80. Coupling to the iris 80 to extract this frequency modulated energy may be accomplished by means well known in the art. The construction and orientation of the ferrite slabs 30 and 32, and the applied magnetic field $H_M$ in the cavity 15 as shown in Figure 1, provides wide frequency deviations which are quite linear with applied field and the accompanying amplitude modulation is very much reduced. The performance obtained for this field and ferrite configuration is considerably better than the performance obtained from prior art magnetically tuned klystron devices, or from all other known ferrite and field configurations. At X-band frequencies, for ferrite slab dimensions of 0.833 inch x 0.100 inch x 0.384 inch, and cavity dimensions of 0.900 inch x 0.365 inch cross section and 0.900 inch long, linear frequency deviations with applied field $H_M$ were obtained over a range of about 240 megacycles with applied fields from about 100 to 300 oersteds and power changes of less than plus or minus 13 percent within this range. The effects of slab thickness and various different field configurations are detailed in our article in I.R.E. Proc., vol. 44, No. 10, October 1956.

Although the performance of the above-described device is considerably better than prior art models, the range of linearity and the accompanying amplitude modulation are still not adequate for many applications.

As regards the linearity of frequency shift with applied magnetic field, we have found that a considerable improvement in linearity can be obtained over a wider range by the addition of a longitudinal biasing magnetic field $H_B$ to the ferrite slabs 30 and 32 as shown in Figure 1. In the X-band device described previously, improvements in linearity are obtained up to a value of bias field $H_B$ of about 300 oersteds. The range over which linear response is obtained is increased by almost 75 percent permitting linear performance for frequency deviations as large as 400 megacycles. Those skilled in the art will understand that the biasing field $H_B$ may be supplied by any of a number of well known means.

As regards the accompanying amplitude modulation, we have found that by applying a modulating voltage to the klystron repeller which is proportional to the current flowing through the coil means establishing the modulating magnetic field $H_M$, the accompanying amplitude modulation can be reduced to very low levels. Figure 5 is a circuit diagram showing how the device of Figure 1 may be connected to provide this proportional repeller voltage. In Figure 5, the biasing field $H_B$ is supplied by coil means 160 having a constant current obtained from a battery $E_B$. The modulating field $H_M$ is obtained by coil means 130 through which a modulating current $I_M$ flows obtained from the source $E_M$. The dashed lines 105 and 106 are intended to represent the magnetic connection between the ferrite slabs 30 and 32 and the magnetic fields $H_B$ and $H_M$.

The klystron 10 is connected with its plate lead 103 grounded, its cathode lead 102 connected to B1— and its repeller lead 104 connected to B2—. A voltage proportional to the modulating current $I_M$ was applied to the repeller 90 by means of a resistor 100 across which the proportional voltage is developed. A capacitor 150 provides D.-C. isolation and a choke 140 provides A.-C. isolation. The value of the proportional voltage applied to the repeller 90 is chosen to have a value which provides minimum amplitude modulation over the range of operation desired. The desirable proportional voltage is not critical and those skilled in the art will readily be able to choose the proper value for any particular application. In the X-band device described previously, a proportional voltage of about 6 volts per 100 oersteds modulation field was applied to the repeller 90 resulting in a reduction of accompanying amplitude modulation from about plus or minus 13% to only plus or minus a few percent over the 240 megacycle range of operation mentioned previously. With both the biasing field $H_B$ and the proportional voltage added, a linear frequency deviation with applied field was obtained over a linear range of about 400 megacycles with less than plus or minus 5% accompanying amplitude modulation throughout this range.

It is to be understood that the particular dimensions of the elements and the magnitudes of the magnetic fields and the proportional voltage applied to the repeller are merely a matter of design and those skilled in the art will readily be able to provide the proper dimensions and magnitudes for any particular application. (Our I.R.E. article mentioned previously contains much useful information in this regard.) Our invention resides particularly in the orientation of the ferrite slabs and the applied magnetic fields in the cavity, and in the provision of the additional bias field to improve linearity, and the addition of the proportional voltage applied to the repeller to reduce amplitude modulation.

It will be apparent that the embodiments shown are only exemplary and that various modifications can be made in construction and arrangement within the scope of the invention as defined in the appended claims.

We claim as our invention:

1. A magnetically tuned klystron comprising in combination: a klystron having an iris adapted to be coupled to an external cavity, a cavity having a rectangular cross section and serving as said external cavity, said iris being coupled to one end of said cavity, said cavity having an output iris at its other end, a pair of rectangular ferrite slabs longitudinally disposed within said cavity adjacent to the short sides of said cavity, and means for applying a tuning magnetic field to said ferrite slabs in a direction substantially parallel to the short sides of said cavity, the oscillation frequency of said klystron being dependent upon the magnitude of said field.

2. The invention in accordance with claim 1, there being additionally provided: means for applying a substantially longitudinal biasing magnetic field to said ferrite slabs.

3. The invention in accordance with claim 1 wherein said klystron has a repeller, wherein said means for applying said tuning magnetic field includes coil means, and there is additionally provided: means for applying a voltage to said repeller which is proportional to the tuning current flowing through said coil means.

4. A wide-band, magnetically controlled, microwave frequency modulation device comprising in combination: a reflex klystron adapted for operation with an external cavity, said klystron having a repeller and a coupling iris, a $TE_{101}$ cavity having a rectangular cross section and serving as said external cavity, said iris being coupled to one end of said cavity, said cavity having an output iris at its other end, a pair of rectangular ferrite slabs longitudinally disposed within said cavity adjacent to the short sides of said cavity, means including coil means for applying a modulating magnetic field to said ferrite slabs in a direction substantially parallel to the short sides of said cavity, means for applying a substantially longitudinal biasing magnetic field to said ferrite slabs, and means for applying a modulating voltage to said repeller which is proportional to the modulating current flowing through said coil means, the magnitude of said biasing magnetic field and said modulating voltage being selected so that minimum amplitude modulation and maximum linearity are obtained.

References Cited in the file of this patent

UNITED STATES PATENTS 2,710,922   Hines _____ June 14, 1955

OTHER REFERENCES

Theory of New Ferrite Modes in Rectangular Wave Guide, Journal of Applied Physics, September 1955, pp. 1184–1185.

Magnetic Tuning of Klystron Cavities, Proceedings of the I.R.E., August 1955, p. 1017.